United States Patent [19]

Wynn et al.

[11] 4,203,695

[45] May 20, 1980

[54] AUTOMATIC BALE WAGON CONTROL SYSTEM

[75] Inventors: Edward J. Wynn, Leola; Cal L. Bryant, Lancaster, both of Pa.

[73] Assignee: Sperry Rand Corporation, New Holland, Pa.

[21] Appl. No.: 933,233

[22] Filed: Aug. 14, 1978

[51] Int. Cl.² .............................................. B65G 57/32
[52] U.S. Cl. ..................................... 414/40; 414/901; 414/902
[58] Field of Search ................... 414/38, 39, 40, 44, 414/901, 902

[56] References Cited

U.S. PATENT DOCUMENTS

| | | | |
|---|---|---|---|
| 3,260,380 | 7/1966 | Skromme et al. | 414/902 X |
| 3,549,023 | 12/1970 | Backman | 414/902 X |
| 3,901,393 | 8/1975 | Butler et al. | 414/40 |
| 3,927,771 | 12/1975 | Butler et al. | 414/902 X |
| 3,945,507 | 3/1976 | Olsen et al. | 414/40 |
| 4,063,652 | 12/1977 | Lee | 414/902 X |
| 4,072,237 | 2/1978 | Colby | 414/901 X |

*Primary Examiner*—L. J. Paperner
*Attorney, Agent, or Firm*—Shlesinger, Arkwright, Garvey and Dinsmore

[57] ABSTRACT

This invention relates generally to automatic bale wagons of the type adapted to pick up crop material bales in the field and automatically form stacks of these bales utilizing a variety of selected tier configurations for forming a stable, interlocked stack of bales.

12 Claims, 16 Drawing Figures

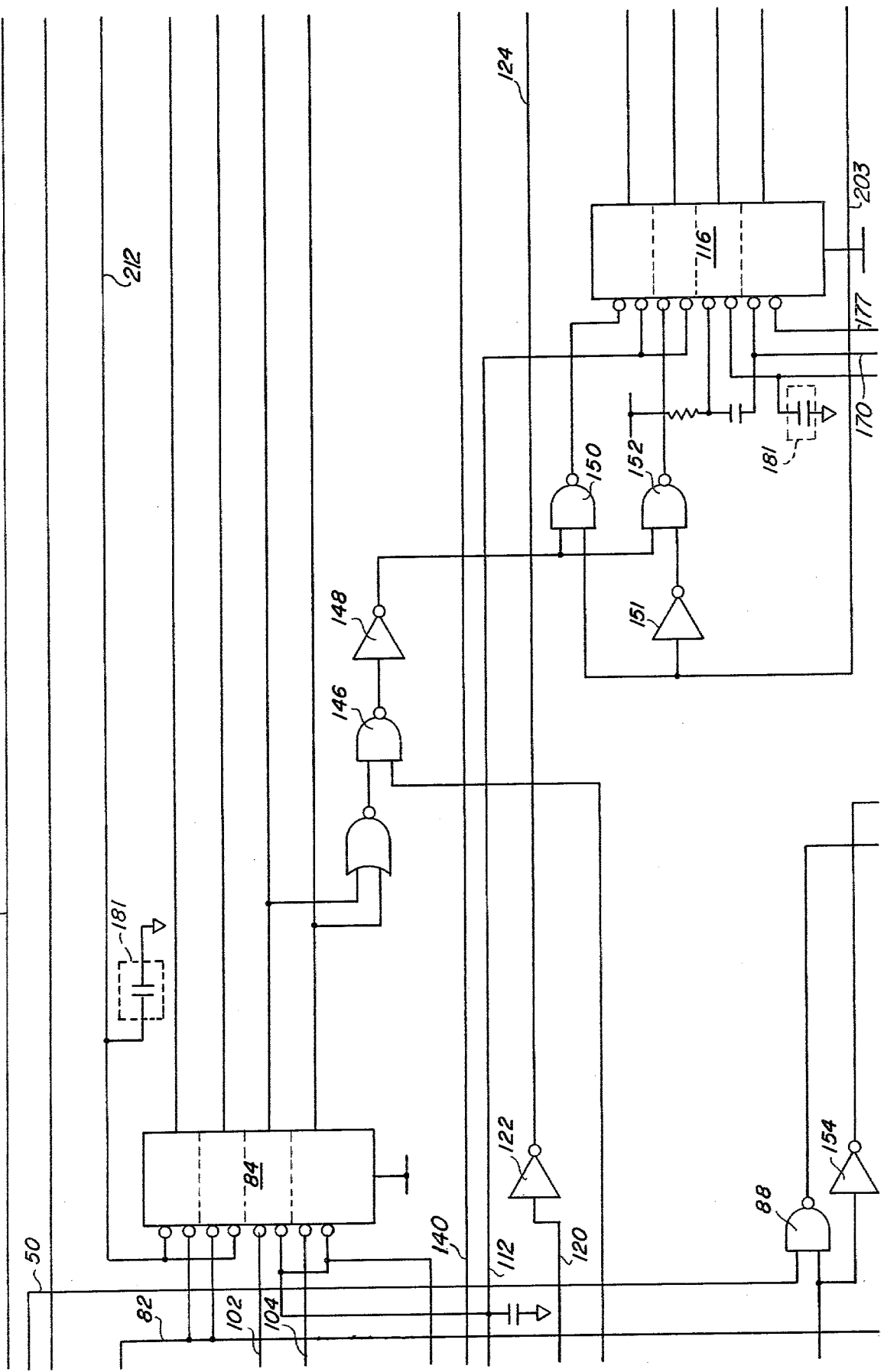

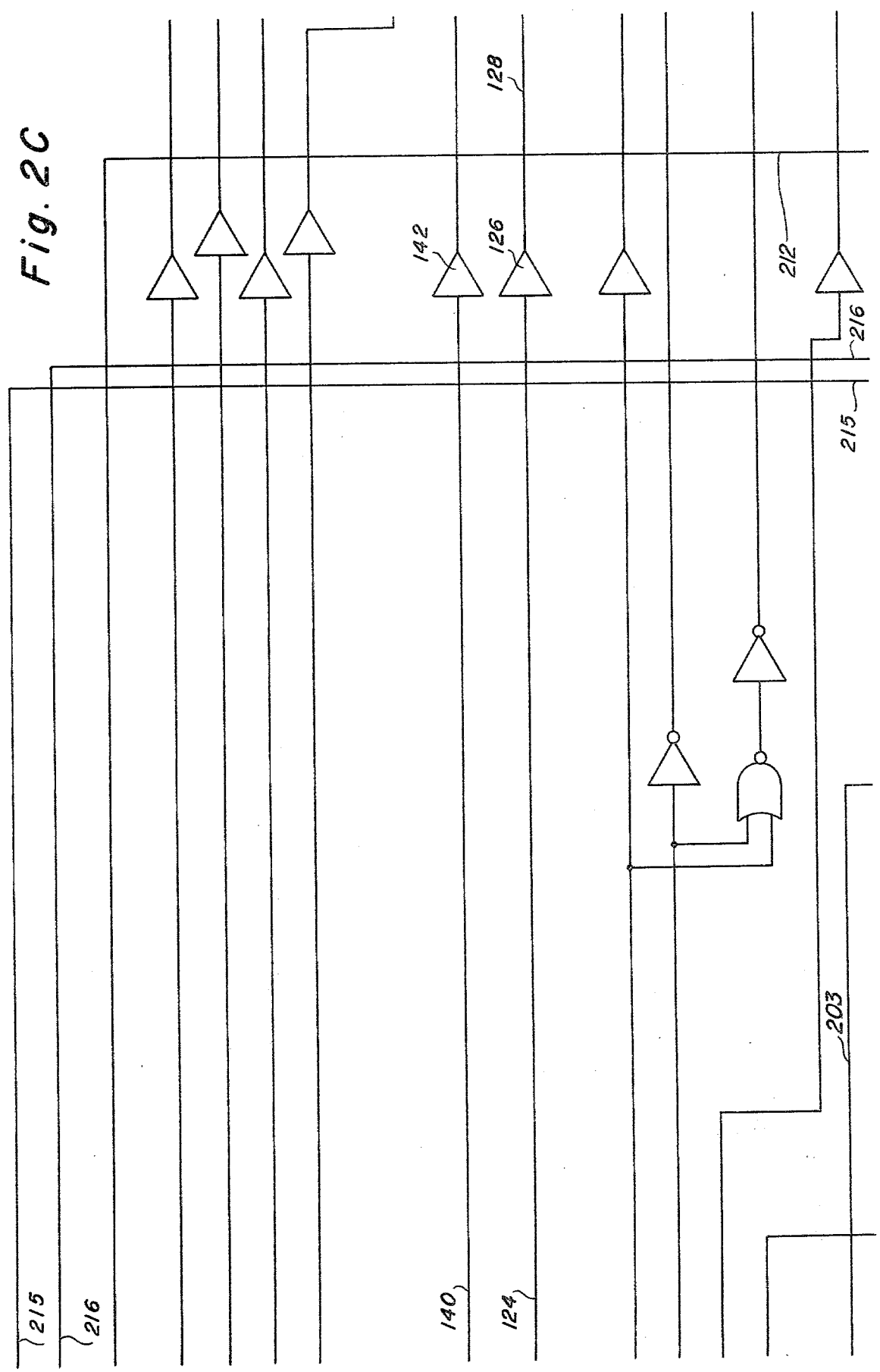

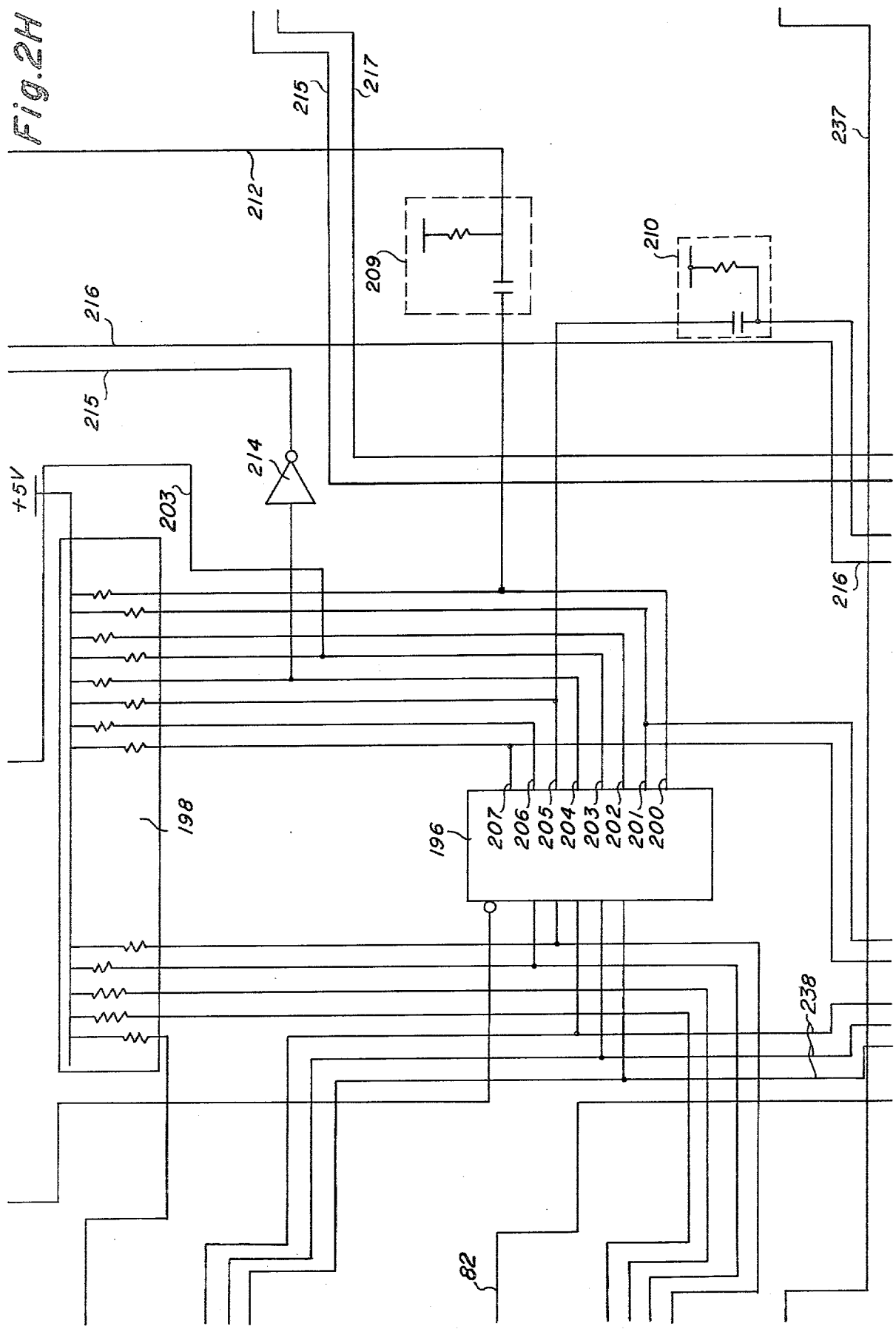

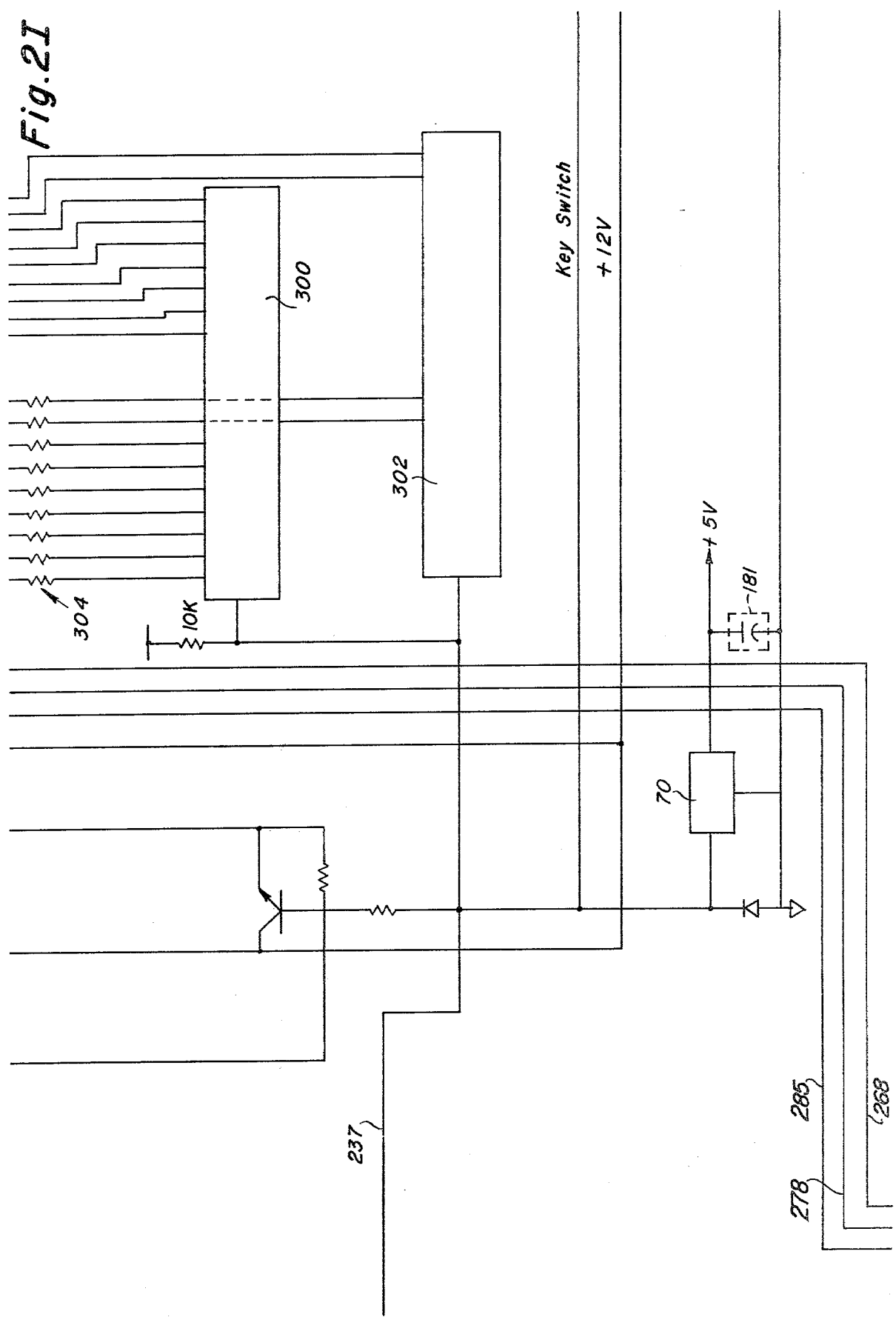

AUTOMATIC BALE WAGON CONTROL SYSTEM

CROSS REFERENCE TO RELATED APPLICATION

This application is related to the co-pending application Ser. No. 933,234, filed Aug. 14, 1978, of R. A. Colby, L. B. Parolini and L. D. Butler entitled "Rolling Rack Control For Automatic Bale Wagon" which is particularly suited for use with the present invention.

This application is also related to the co-pending application Ser. No. 933,243, filed Aug. 14, 1978, of C. L. Bryant and E. J. Wynn entitled "Bale Alignment Mechanism Actuating Device" which is particularly suited for use with the present invention.

BACKGROUND OF THE INVENTION

Present day practices in crop harvesting involve the formation of bales of crop material such as hay or the like into stacks for storage by the employment of an automatic bale wagon. One type of bale wagon for use in this manner, which has achieved wide spread commercial acceptance, is the automatic bale wagon which employs the three table concept as originally illustrated and described in U.S. Pat. No. 2,848,172 issued to Gordon E. Grey.

The Grey bale wagon includes a first table which receives bales from a bale loader or pick up device mounted on the bale wagon, and accumulates a predetermined number of these bales on this first table, for example two, the bales being arranged thereon end-to-end in a row. A second table successively receives the accumulated rows of bales from the first table and accumulates a plurality of such rows, for example four, five or six rows, which plurality of rows is commonly known as a tier of bales. A third table or load bed successively receives the tiers from the second table and accumulates a plurality of these tiers, for example seven, to form a stack thereon. Once the stack has been accumulated on the load bed, it may be unloaded by pivoting the load bed 90° and depositing the stack on the ground or the like so that the first tier of bales which was accumulated on the second table is now the lowermost tier of the stack in contact with the ground surface.

The Grey bale wagon deposited all of the bales in such a manner that the tiers were formed with all bales laying on their edge sides so that the bales forming the lowermost tier are oriented such that a non-twine or -wire bearing side of each bale, commonly refered to as an "edge" of the bale, is in contact with the ground in order to avoid wire rusting or twine rotting which eventually would result in broken bales in the lowermost tier and would probably cause toppling of the stack.

In order to enhance the stability of the stack, it is desirable to provide one or more tie tiers within the stack, such being tiers having individual bales arranged to overlap two bales in adjacent tiers above and below the tie tier. Formation of one or more of such tie tiers can be accomplished during formation of the stack on the bale wagon, for example through utilization of a mechanism which is similar to that illustrated and described in U.S. Pat. No. 3,395,814, which has been incorporated into several present day commerical models of the Grey bale wagon.

U.S. Pat. Nos. 3,945,507 to James A. Olsen et al and 3,927,771 to Lee D. Butler et al; the specifications of which are incorporated herein by reference, relate to improved bale wagons for facilitating the formation of a block-type stack on the wagon, and particularly, these improvements facilitate tier pattern selection and formation on the wagon as well as formation of bales into a predetermined sequence of tier patterns to form a block.

The Olsen et al and Butler et al patents disclose an improved arrangement whereby bales may be placed selectively either "on edge" or "on flat" on the second table so that the appropriate tier pattern may be formed in the proper position as the stack is being formed on the wagon. The wagon utilizes a mechanical memory system incorporating a multi-lobed rotatable cam and follower, the cam lobes defining a plurality of positions representing one of the tier patterns.

A plurality of sensors are provided on the second table of the bale wagon in the form of paddles which are depressed when a bale is placed on the paddle, thus indicating the position of the bale on the table. Means are provided for responding to the addition of each of the tiers of bales to advance the cam to the next position for forming the next tier in the proper configuration.

This system represented a significant improvement in bale wagons in that it relieved the operator of the necessity of remembering the particular stack patterns he wanted to build and of constantly counting the tiers as they were formed and deposited on the load bed and actuating the appropriate mechanisms for forming the tie tiers.

One disadvantage, however, of this bale wagon was the complexity of the mechanical and hydraulic systems for controlling the various operating modes and functions, and controlling the hydraulic actuators therefore. The more operational modes built into such a system, the more complex are these mechanical and hydraulic actuator mechanisms, which can in turn lead to more costly repairs and more extensive service time when the equipment suffers a breakdown. Additionally, the more complex the mechanical and hydraulic interconnections, the more costly is the overall piece of apparatus.

Accordingly, it is a primary object of the present invention to provide an improved control system for a bale wagon which may be described as electrohydraulic in nature.

A further object of the present invention is to provide a control system for a bale wagon which is more reliable than prior art control systems and has fewer maintance and related problems.

SUMMARY OF THE INVENTION

The present invention thus relates to an automatic control system for a bale wagon, particularly a bale wagon using bale accumulating means such as a plurality of tables, for example three. The control system includes an electronic memory package wherein a plurality of commands are stored for a plurality of different stack configurations. The operator may select any one of the stack configurations merely by moving a selector switch. A plurality of sensors on the bale wagon are provided for giving a signal indicative of the states or positions of the various operating components, and these signals are transmitted through an electronic gating network and combined with signals from the memory output according to the selected stack configuration, thus generating further signals for operating the solenoid valves controlling the flow of hydraulic fluid to the hydraulic actuators for the bale wagon.

The system also includes a liquid crystal display panel whereby the operator may determine at a glance at just what stage of a stack forming sequence the bale wagon is in at any time.

Further, the system also includes a manual override capability whereby the operator can perform special functions or form special stacks of his own choosing in addition to those pre-programmed into the memory unit.

Additionally, a short circuit protection system is included in the overall control system to prevent damage to the mechanical and or electronic components of the bale wagon if a short circuit should occur in the control system.

The memory unit is of the static or sequential logic type utilizing a read only memory (ROM) device. The enabling conditions are supplied by a ROM in a sequential mode to a series of latches. The latches also receive signals from the electronic gating network, and when the proper combination of signals has been received by a latch, the latch provides a signal to one or more of a series of driving transistors for operating the solenoid valves associated therewith in the proper mode.

DESCRIPTION OF THE DRAWINGS

During the following detailed description of this invention, reference will be had to the accompanying drawings in which:

FIGS. 2A through 2M are a schematic of the electronic circuitry of the control system of this invention;

DETAILED DESCRIPTION OF THE INVENTION

Figure 4:
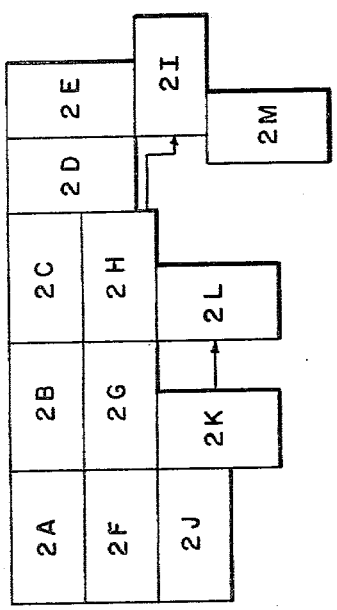
FIG. 4 is a schematic view illustrating the relationship of FIGS. 2A through 2M to each other.
Figure 1:
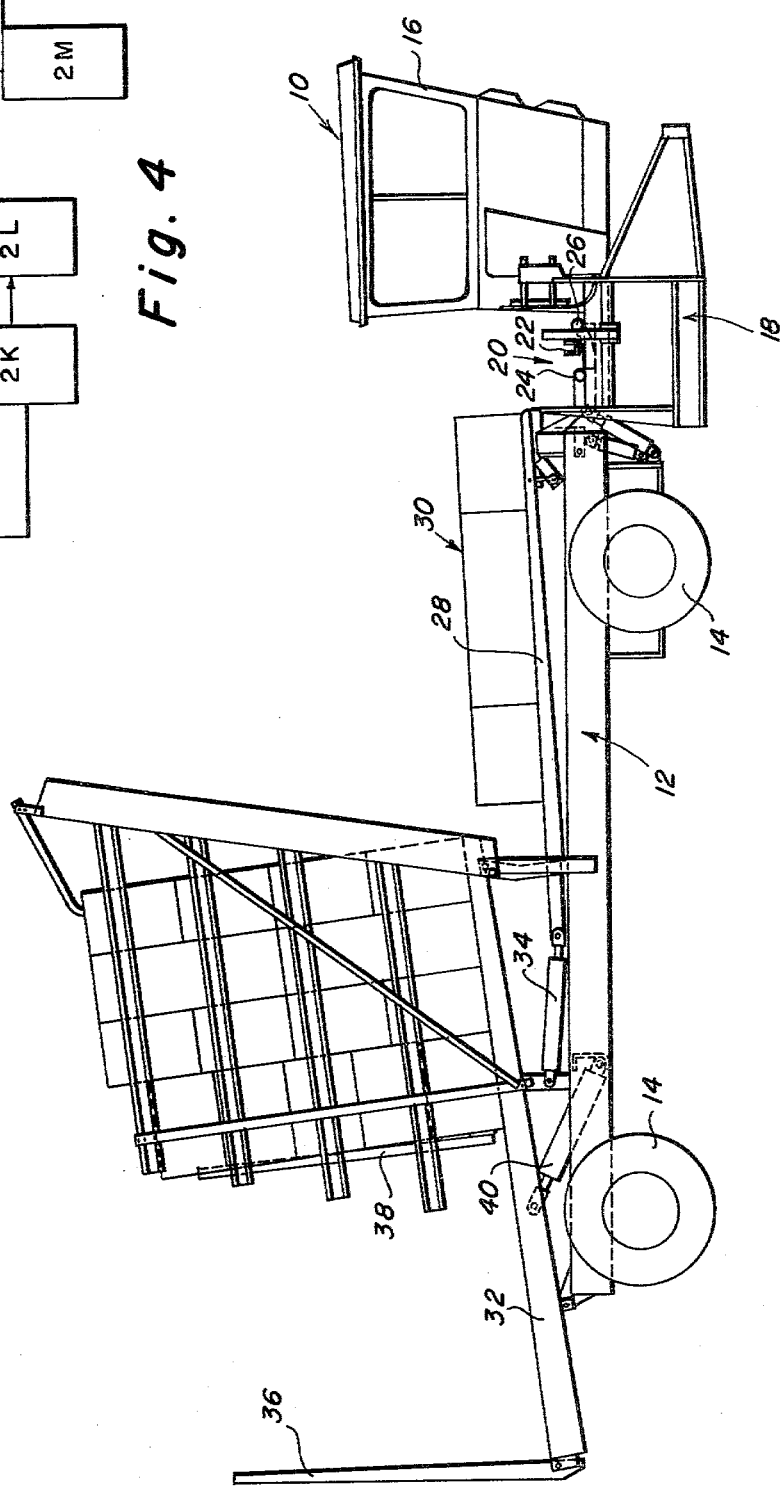
FIG. 1 is a side elevational view of a bale wagon embodying the principles of the present invention, and showing the bale wagon with a partially formed block-type of bales on its third table or load bed, and during formation of a tier of bales on its second, tier forming table.

Referring firstly to FIG. 1, the bale wagon generally designated 10 is provided with a mobile chassis generally designated 12 having wheels 14 and an operator cab 16. The cab 16 also includes the various controls both for the operation of the bale wagon as a vehicle and for the operation of the various bale loading and stacking portions of the machine.

The bale wagon 10 is provided with a bale loader generally designated 18 adapted to pick the bales up successively from the field and deposit them on the first table 20. The first table 20 is provided with a cross conveyor 22 positioned between rails 24 and 26, in such a manner that the bales are dropped onto the first table 20 and are impaled upon the tines of cross conveyor 22. The operation of the cross conveyor 22 is more fully described in copending application Ser. No. 933,243, filed Aug. 14, 1978, of C. L. Bryant and E. J. Wynn, and entitled "Bale Alignment Mechanism Actuating Device".

Generally speaking, the cross conveyor 22 initially receives the bales and moves them toward the left side of the machine until a left side switch is actuated. The cross conveyor then reverses and pulls the right-most bale until a right side limit switch is contacted and the conveyor is halted. In this manner, the sides of the bales in the stack are aligned evenly on both sides of the stack, providing a more stable stack.

After the appropriate number of bales has been deposited on the first table 20, the first table is caused to cycle in the manner described in U.S. Pats. 3,945,507 and 3,927,771 to deposit the first two bales onto the second table 28. Depending upon the manner in which the first table rails 24 and 26 are actuated, the bales will be placed upon the second table either "on edge" or "on flat". Ordinarily, the first, or first and second, tier of bale is arranged on edge, and the remaining tiers are arranged on flat. After a plurality of bales have been deposited on the second table so as to form a tier 30, the second table 28 is caused to cycle and deposit the tier 30 onto the third table or load bed 32. For this purpose, a hydraulic cylinder 34 is provided for raising the table 28.

The third table 32 is provided with a plurality of support tines 36 at the rearward end thereof, and additionally is provided with a rolling rack 38 against which the various tiers of bales are deposited. As succeeding tiers are deposited onto the load bed 32, the rolling rack 38 is caused to retract a distance substantially equal to the thickness of a tier, thus providing the necessary space for the newly added tier 30. After a complete stack has been formed on the load bed 32, the operator of the bale wagon drives the wagon to the appropriate location for storage of the stack, and then actuates the appropriate control mechanism to extend hydraulic cylinder 40 causing the load bed 32 to pivot approximately 90°. Thereafter, pusher feet (not shown) are extended and the stack of bales is pushed off of the support tines 36 and deposited on the ground. The load bed 32 is then caused to return to its position as seen in FIG. 1, and a new cycle of operation begins.

The electronic circuit described herein is comprised of Complimentary Metal Oxide Semiconductor (CMOS) integrated circuits although the device of any logic family could be substituted for the devices described below. It is generally considered that such devices are at one of two logic states, either a logic level "0" or a logic level "1".

Figure 2A:
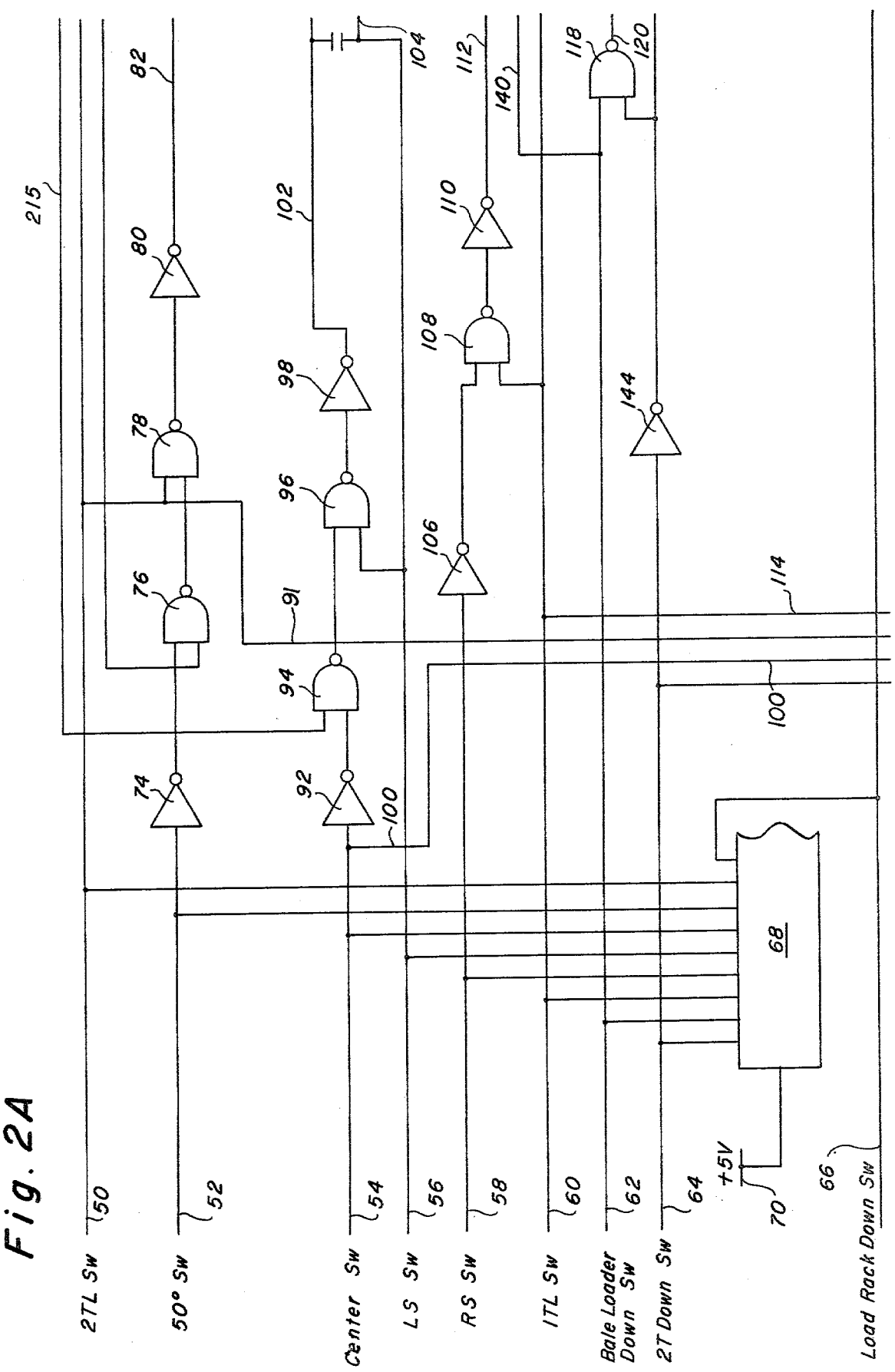
Figure 2D:
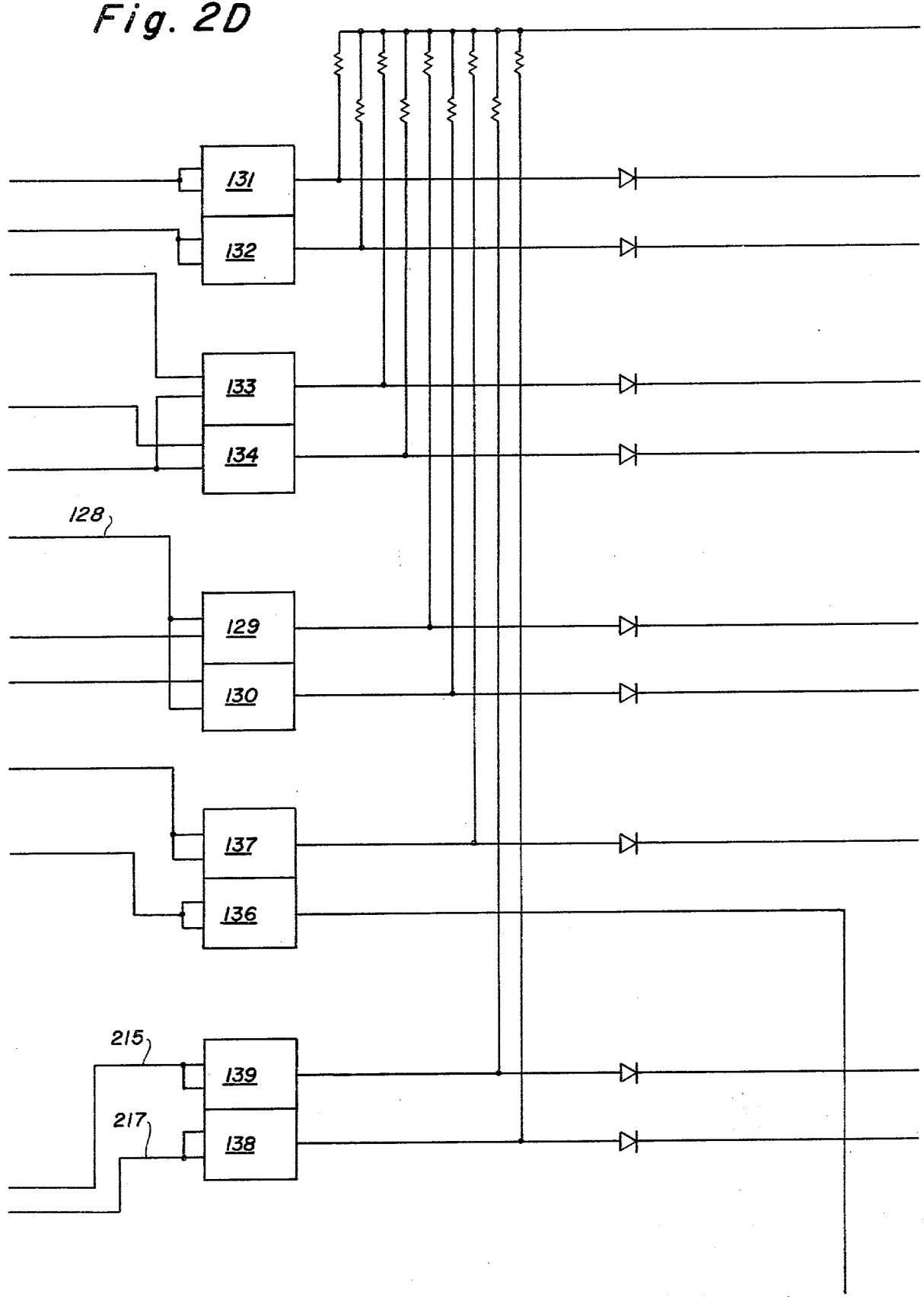
Figure 2E:
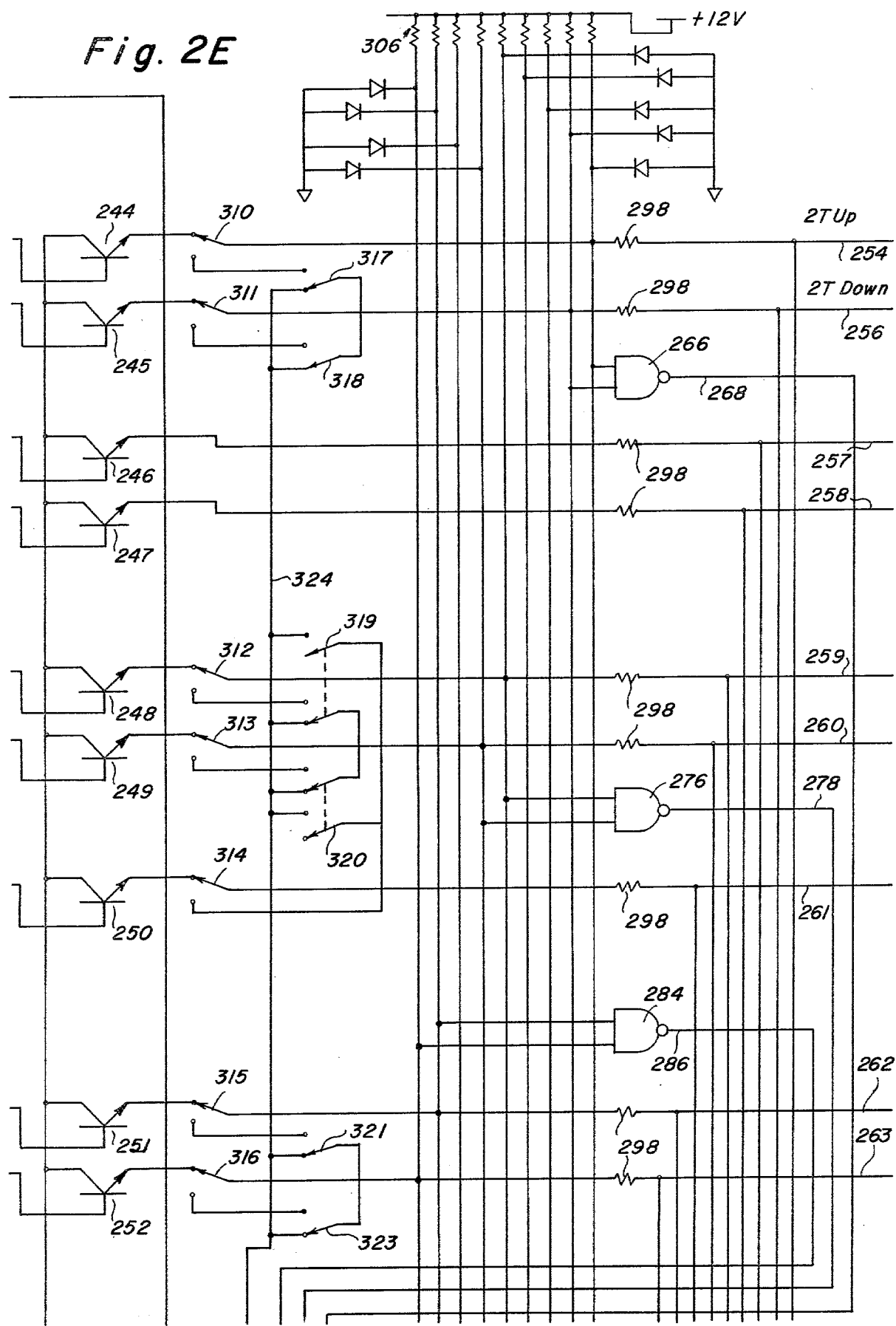

Referring now to FIGS. 2A through 2M, which comprise the electronic circuit for the control system, reference will first be had to FIG. 2A. A plurality of sensors such as limit switches, hall effect switches, or the like (not shown) are provided for giving an indication of the state of various operating components of the bale wagon. Line 50 is connected to a second table limit sensor. Line 52 is connected to a second table 50° sensor, line 54 is connected to a first table center bale sensor, line 56 is connected to a first table left side sensor, line 58 is connected to a right side switch, line 60 is connected to a first table limit sensor, line 62 is connected to a bale loader down sensor, line 64 is connected to a second table down sensor, and line 66 is connected to a load rack down sensor.

Thus line 50 changes logic levels when the second table reaches its uppermost limit and activates the second table limit sensor. Similarly, when it is necessary for the second table only to tilt to an angle of approximately 50°, such as is required in the formation of tie tiers as described in U.S. Pat. Nos. 3,945,507 and 3,927,771, the logic level changes on line 52 when the second table has reached the position of approximately 50° and thus has activated the 50° limit sensor.

The first table center bale sensor, left side sensor, and right side sensor as connected to lines 54, 56 and 58, are related to the positioning of bales on the first table 20. Thus in formation of edge or flat tiers, the left side sensor changes the logic level on line 56 when a bale is moved to the extreme left side of the first table 20 by means of the cross conveyor 22, while the logic level changes on line 58 by means of the right side sensor when the bale is of the proper length so as to trigger the right side switch when the bale is dropped on the first table, or when by reversal of the cross conveyor 22, the bale is moved toward the right side of the bale wagon and thereby trips the right side sensor. In the formation of tie tiers, at certain stages, only a single bale is deposited at a time on the second table 28, and then the center sensor is utilized to change logic levels on line 54 indicating that this bale has been placed at the proper position on the first table 20.

When the appropriate number of bales, for example one or two depending upon the type of tier being formed, has been deposited on the first table 20, the first table is caused to cycle and deposit the bale or bales onto the second table. In so doing, the first table activates the first table limit sensor and thus changes the logic level on line 60.

In order for any bales to be loaded on the bale wagon, it is of course necessary that the bale loader 18 be lowered to the position where it may receive bales. When it is in the proper position, the bale loader down sensor is activated changing the logic level on line 62. As an additional interlock, since it is necessary for the second table to be down in order to receive bales from the first table, a second table down sensor is provided and changes the logic level on line 64 when the second table is in the proper position.

As a further interlock, since it is necessary for the load rack or load table 32 to be down in order to receive a tier of bales 30 from the second table 28, a load rack down sensor is provided which changes the logic level on line 66.

Figure 2F:
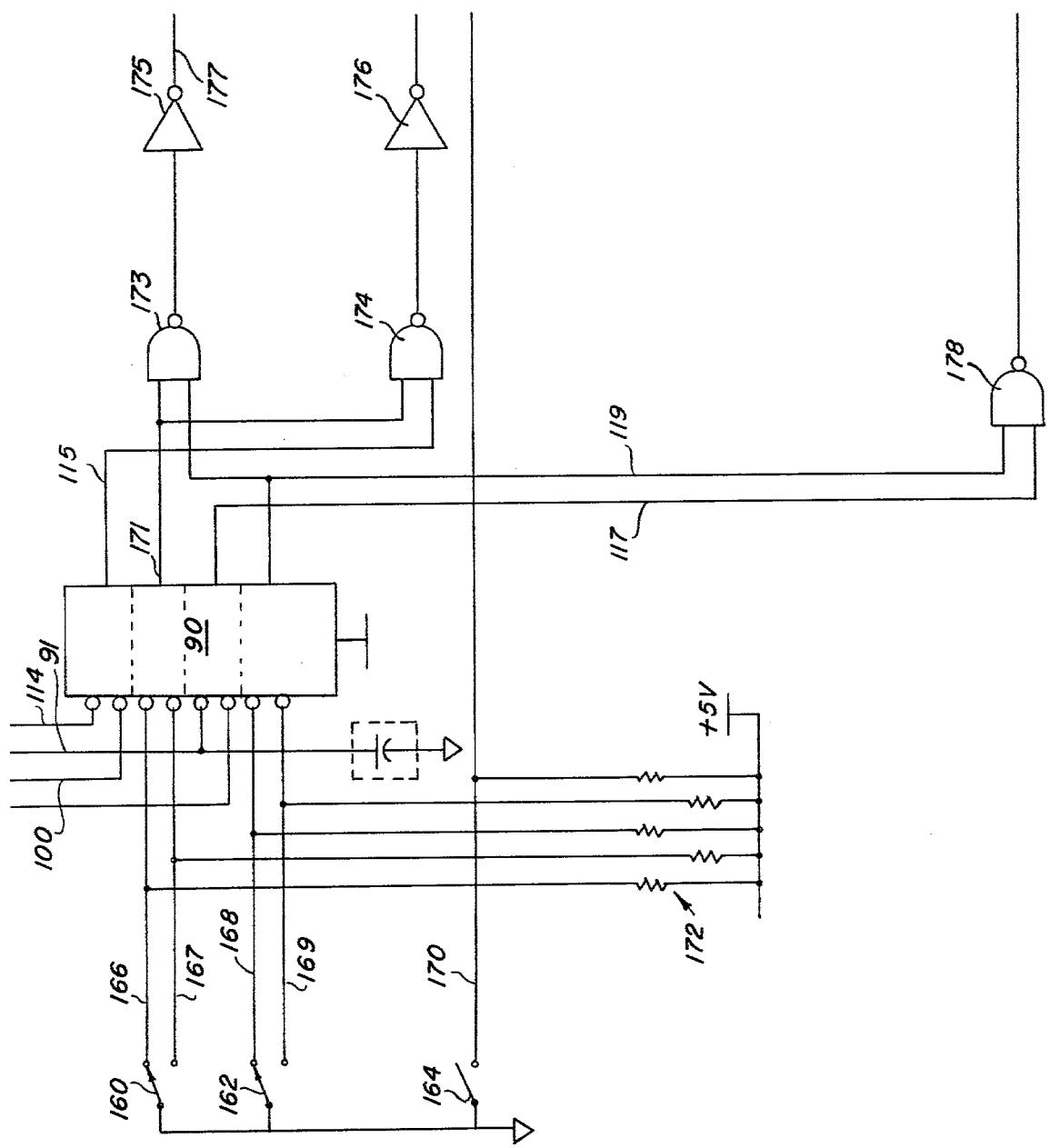
Figure 26:
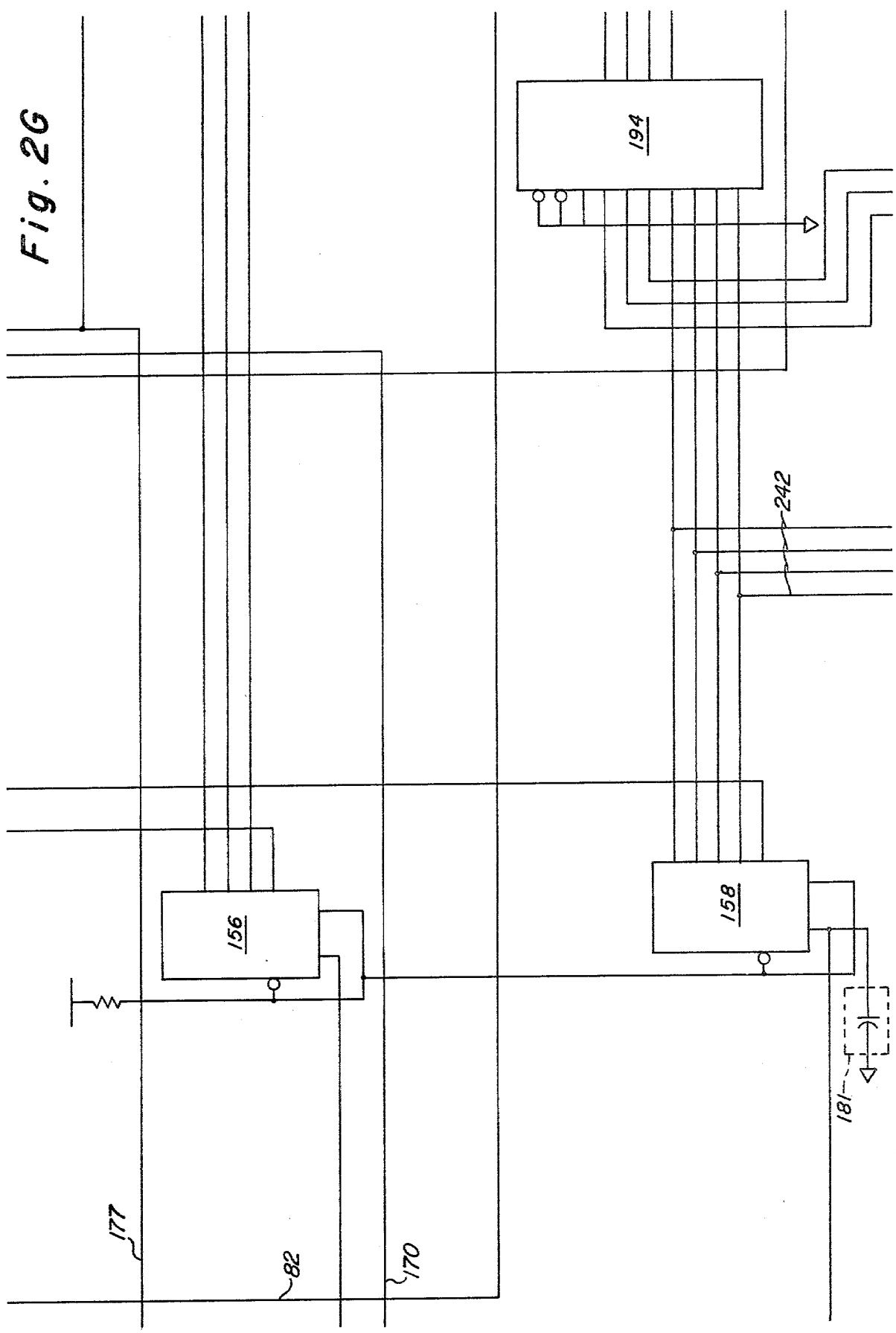

Each of the lines 50, 52, 54, 56, 58, 60, 62, 64 and 66 is pulled up by means of a 10 KΩ resistor network 68 connected to a five volt source 70. The logic level on line 52 is reversed by an inverter 74 and processed by two gates 76 and 78 and the resultant logic level is reversed by another inverter 80. The resulting logic level is then transmitted by means of line 82 to a device 84. Device 84 is a set of four CMOS latches, type CD4044. Additionally, the logic level is delivered by line 82 to an additional device 86, (FIG. 2L).

The logic level on line 50 is delivered to gate 78, to gate 88 (FIG. 2B) and to device 90 (FIG. 2F) along line 91. Device 90 as well as device 86 are the same type CD40444, as device 84.

The logic level on line 54 is reversed by inverter 92, then processed by gate 94, gate 96, and inverter 98; with the resultant logic level being transmitted to device 84 along line 102. Additionally, a logic level from the center sensor is delivered along line 100 to device 90.

The logic level of the left side sensor is transmitted along line 56, processed by gate 96, reversed by inverter 98, and the resultant level is transmitted to device 84 along line 102. The logic level is also delivered along line 104 to device 84.

The logic level of the right side sensor transmitted along line 58 is reversed by to an inverter 106, processed by gate 108, reversed by inverter 110 and the resultant level transmitted along line 112 to device 84.

The logic level of the first table limit sensor is transmitted along line 60 to gate 108, device 116 (a type CD4044 latch) and to device 90 by line 114, and also processed by gate 108 and transmitted to sensor 116 which is also a type CD4044 latch.

The logic level of the bale loader down sensor is transmitted along line 62, processed by gate 118 and then the resulting logic level is transmitted along line 120, reversed by inverter 122, from which the logic level is transmitted along line 124 to buffer 126 and thence along line 128 to a transistor drivers 129 and 130. Drivers 129 and 130, as well as driver 131, 132, 133, 134, 135, 136, 137, 138 and 139 are all of the same type, type 75451. The function of these drivers will be explained more fully later. The logic level of line 62 is also transmitted via line 140 through buffer 142 to transistor driver 134.

The logic level of the second table down sensor is transmitted along line 64, reversed by inverter 144, processed by gate 146, the resulting signal reversed by inverter 148, and thence processed by gates 150 and 152 from which the resultant logic levels are transmitted to device 116. The inverted logic level of line 64 is also delivered to gate 120.

Finally, the logic level of the load rack down sensor is transmitted along line 66 which is processed by gate 88 and reversed by inverter 154. The resultant logic level from 88 is transmitted to the first table counter 156, while the logic level from the inverter 154 is fed to the second table counter 158. Counters 156 and 158 respectively count the number of times the first table and the second table have cycled in a particular sequence, as will be discussed more fully hereinafter. Counter 156 is a CMOS synchronous four bit up/down binary counter, while counter 158 is a CMOS synchronous four bit up/down decade counter. The logic level from the load rack down sensor, reversed by inverter 154 is delivered to the reset pin of the second table counter. Similarly, the logic level from the load rack down sensor through gate 88 indicates that the load rack has been disposed from its down position thus delivering the proper logic level to reset the first table counter 156. Similarly the proper logic level from the second table limit sensor will reset the first table counter to zero.

In the event that the operator is beginning operation with some bales already on the first table 20, second table 28 or load rack 32, it may be necessary to advance or preset the counts in the counters 156 and 158 in order that the proper subsequent sequences will be followed to complete the stack. To accomplish this, as seen in FIG. 2F, a switch 160 is provided to advance the count of the first table counter. Similarly, switch 162 is provided to advance the count of the second table counter by alternatively setting and resetting a latch contained in device 190. The switch 164 serves as a safety device by resetting a latch contained in device 116, the resultant signal of which is connected to the enable pin of device 196, the effect of which will be explained more fully later. The logic level of a particular line 166, 167, 168, 169 or 170 is held to a logic level of one by the 10 KΩ resistor network 172 until a particular line is connected to ground by the appropriate sensor or switch. The resultant logic level from a latch contained within device 90 caused by the logic level of lines 166 and 167 is transmitted through line 171 to gates 173 and 174. The appropriate output from gate 174 which is determined by the logic levels of lines 115 and 171, inverted by 176, will cause the first table counter 156 to advance one count. Similarly, the resultant logic level from a latch in device 90 caused by the logical level of lines 168 and 169 will be transmitted to gates 178 and 173. The resultant logic level of gate 178, which is dependent upon the logic level of lines 117 and 119, is transmitted to the second table counter 158 which advances one count at the appropriate logic level. Because certain hydraulic functions can occur with changes in either the first or second table counters, a latch within device 116 will be set such that the device 196 will have no output levels which could cause one of the hydraulic functions to operate. This latch is reset by closing switch 164 which causes the latch in device 116 to be reset such that the resultant logic level allows device 196 to operate normally.

Figure 2J:
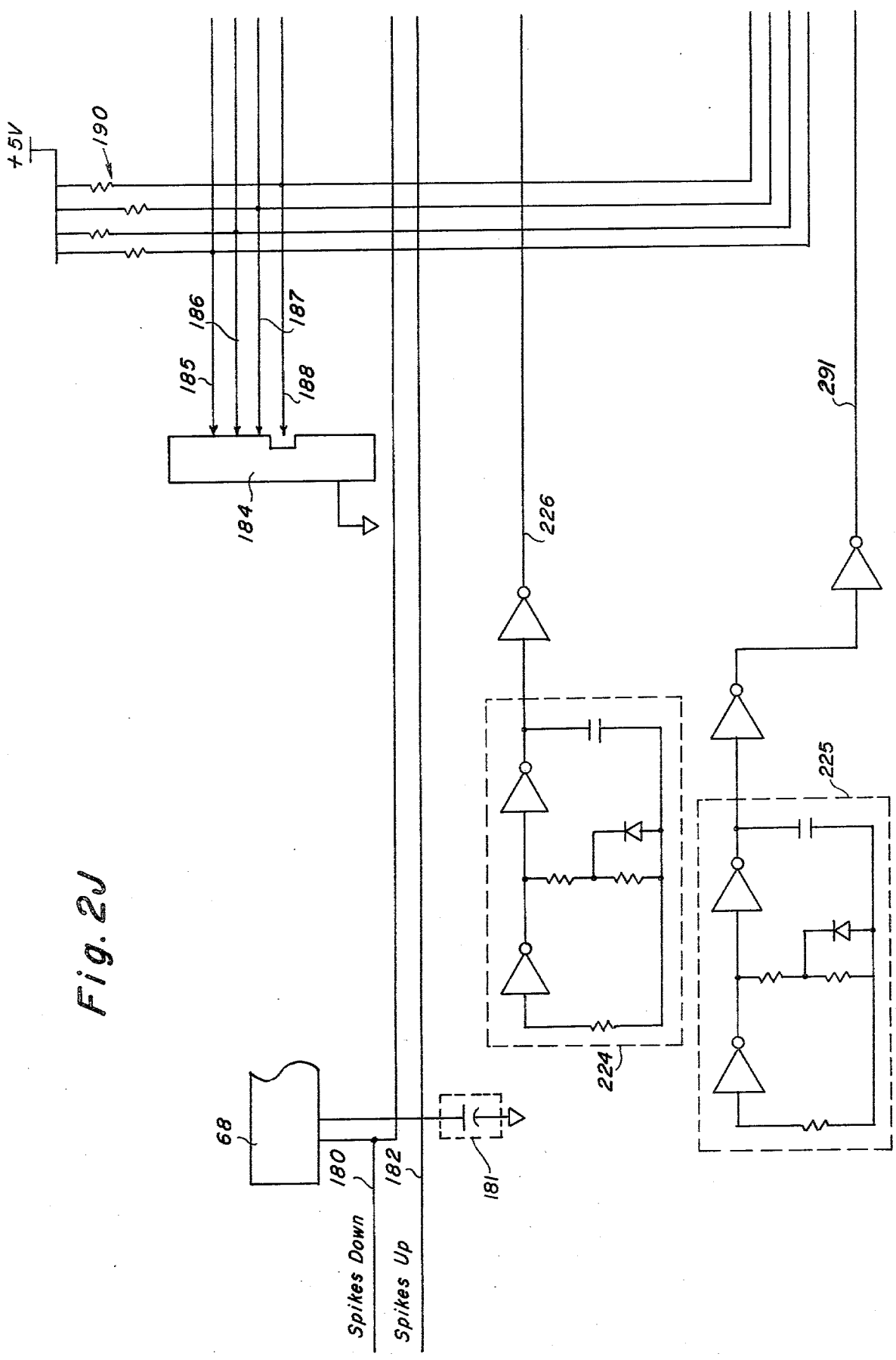
Figure 2K:
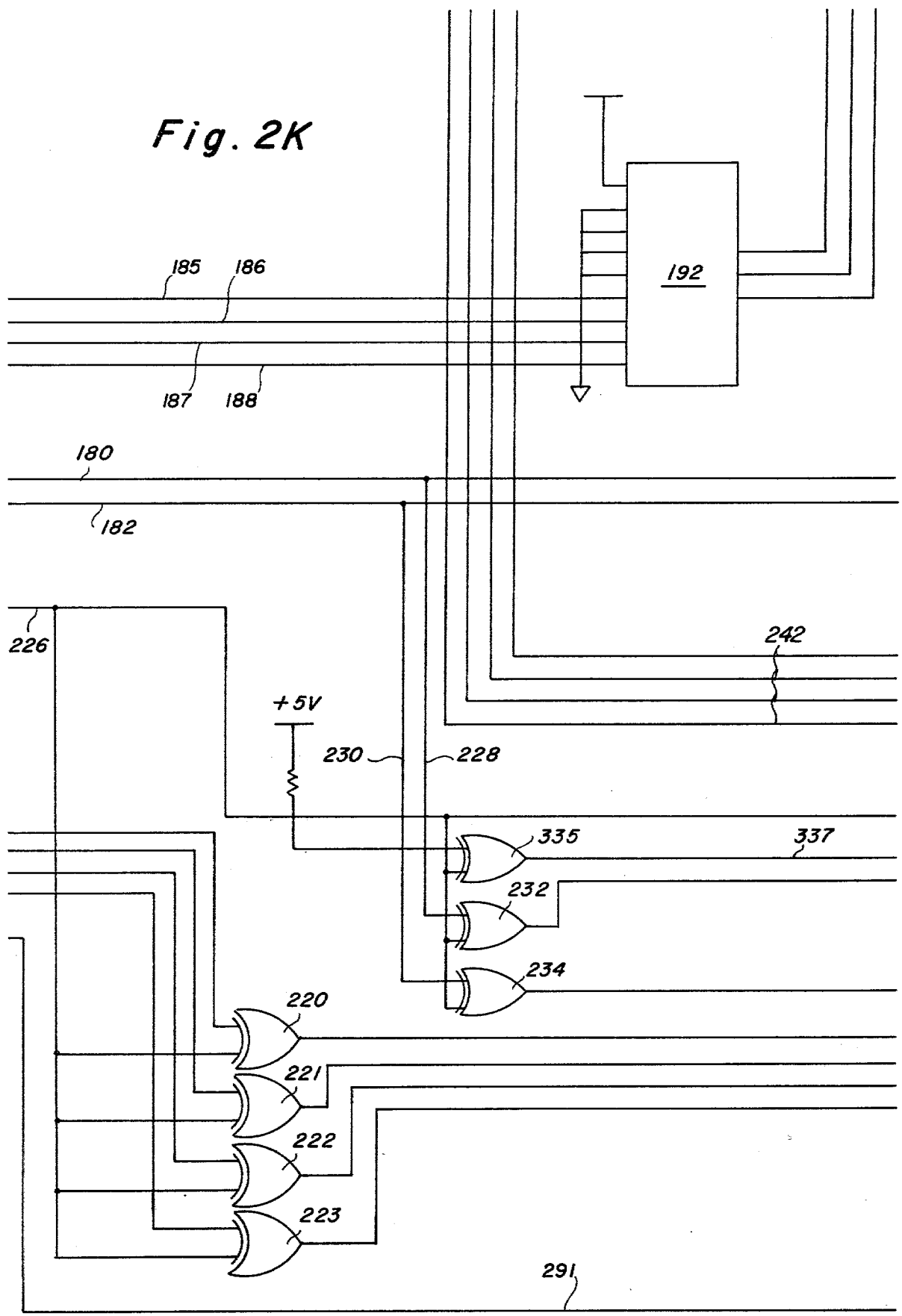
Figure 2L:
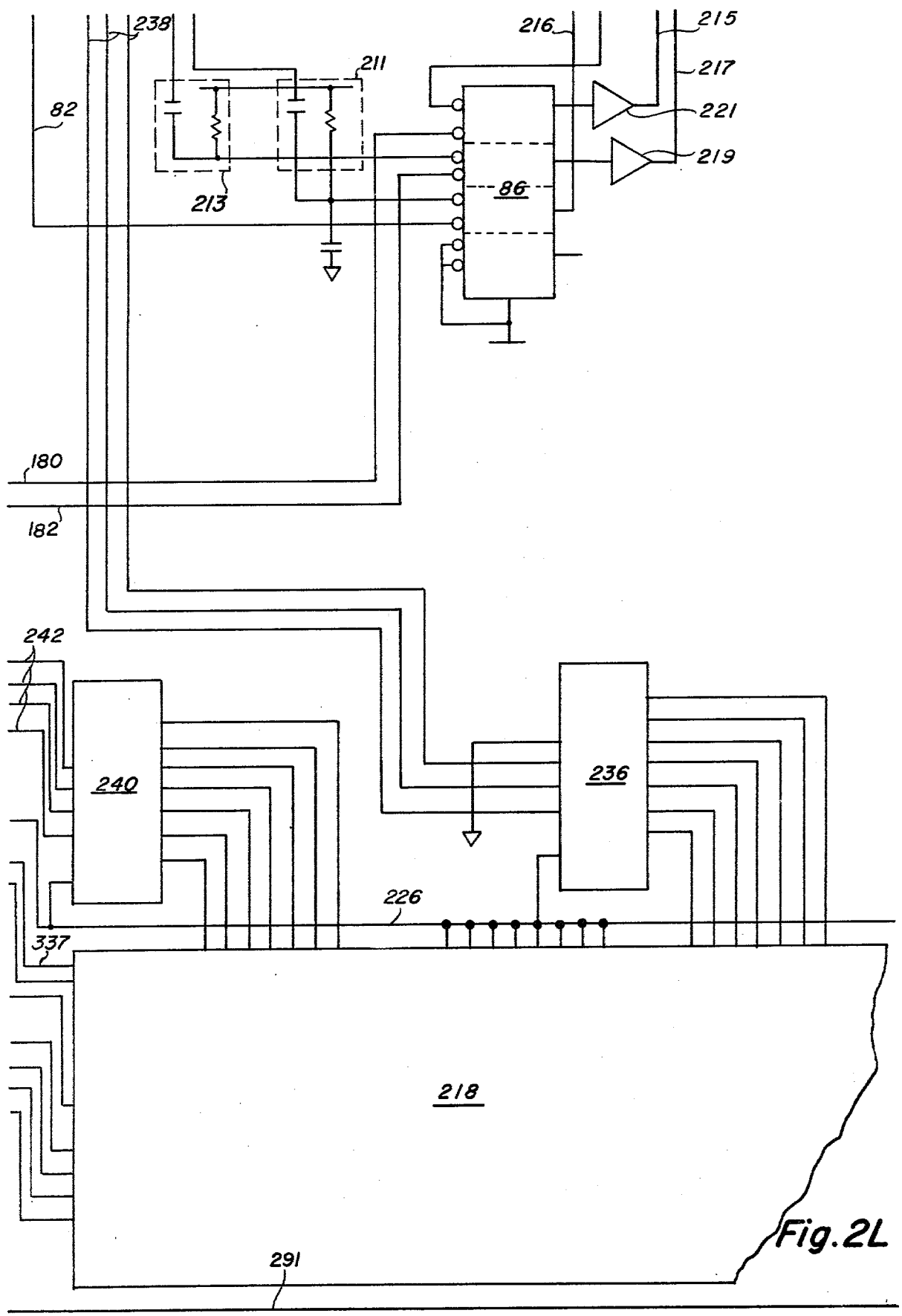
Figure 2M:
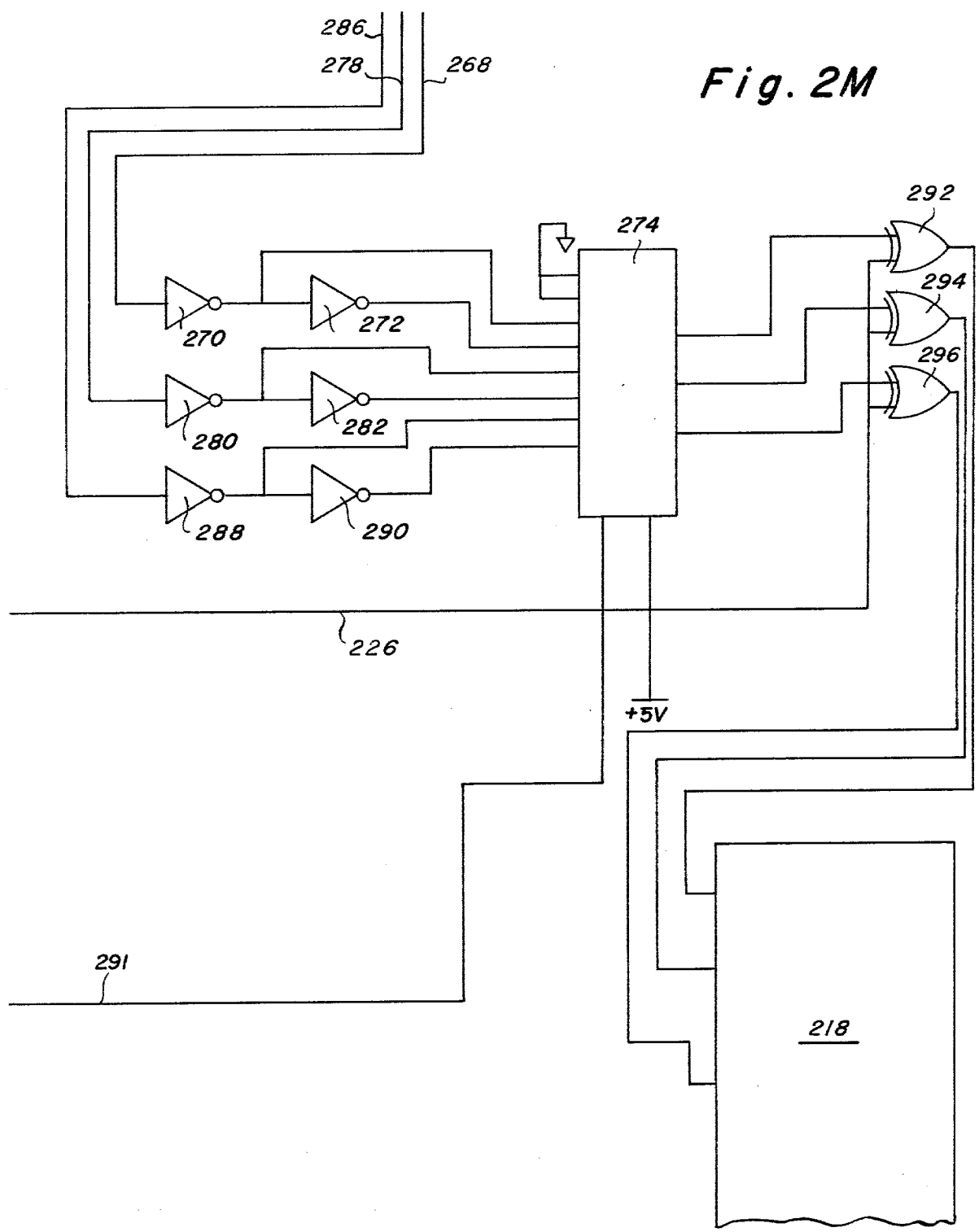

Referring now to FIG. 2J, sensors located at the tie tier forming spikes are provided to signal whether the spikes are up or down. Thus, the appropriate logic level is transmitted on line 180 to latch 86, while the appropriate logic level is transmitted on line 182 to latch 86, these sensors indicating that the spikes are in an up or down position. All capacitors 181 are a "power on" clear for the appropriate line, which causes the line to have a logic level 0 for a brief time after the unit is turned on.

A stack configuration selector switch 184 is provided in the cab 16 of the bale wagon. As shown the switch 184 is a four position switch, however provision is made for more or less configurations as may be desired. By moving switch 184 to the desired stack configuration, a logic level 0 is removed from one of the lines 185, 186, 187, or 188. The selected one of the four output lines 185–188 is held high by means of the 10 K$\Omega$ resistor network 190. Thus in the position shown, a logic level of one is delivered on line 188 to the binary encoder 192. This is a CMOS unit type MC14532 with a three bit output. The output from encoder 192 is delivered to the three most significant address line in use of the read only memory device (ROM) 194 which is a type MM6300-1 (Monolithic Memories) or equivalent, having a four bit output. (For this ROM, the most significant address line is not in use, and is reserved for future expansion.) ROM 194 is also addressed with output from the second table counter which is delivered to the four least significant address lines of ROM 194. This memory device is programmed for the various stack configurations to be used, the output of which determines how a particular tier is formed by addressing the appropriate section of ROM 196. Memory unit 194 (FIG. 2G) is thus addressed by the binary selection of the stack and by the output of the second table counter 158. Although ROM 194 is a four bit output type, only two of the output bits are used, the others being reserved for future expansion.

The output from ROM 194 is delivered to the two most significant address lines of the second ROM 196, along with the output from the first table counter which is delivered to the three least significant address lines of ROM 196. ROM 196 is a Monolithic Memories type MM6330-1 or equivalent. Resistor network 198 contains pull up resistors for the outputs of ROM 194 and ROM 196.

Output lines 202 and 206 of ROM 196 are reserved for future expansion. The output from ROM 196 along line 200 passes through differentiator network 209 and thence along line 212 to a latch in device 84. The output from ROM 196 along line 201 passes through differentiator network 211 to a latch in device 86. The output along line 203 is reversed by inverter 151, processed by gate 152 and thence delivered to a latch in device 116, and is also processed by gate 150 and delivered to a latch in device 116, for the edge-flat delivery selection. The output along line 204 is reversed by inverter 214, transmitted along line 215 to gate 94 for enabling the first table center switch.

Output along line 205 is delivered through differentiator network 210 to a latch in device 86. Output on line 207 is delivered through differentiator network 213 to a latch in device 86.

Thus the output along lines 201 and 207 set the appropriate latch in device 86 for directing the positioning of the tie tier spikes in the up and down mode along lines 215 and 217 and their associated buffers. Lines 180 and 182 serve to reset the appropriate latch when the tie tier spikes have attained the appropriate position.

To facilitate operation of the bale wagon by the operator, a liquid crystal display 218 (FIGS. 2L and 2M) is provided. Selection of a stack configuration by switch 184 results in a logic level being delivered to one of gates 220, 221, 222, or 223 to display which stack has been selected, for example configuration A, B, C, or D. The display of the selected configuration is controlled by a synchronizing or timing pulse from clock circuit 224 along line 226. Similarly, a display indicating whether the tie tier forming spikes are up or down is provided from lines 180 and 182 through lines 228 and 230, to gates 232 and 234 also which are controlled with a timing pulse from line 226.

The display panel 218 also receives signals indicative of the number of cycles made both by the first table and the second table during a sequence. Thus, first table counter 156 delivers an output to liquid crystal driver 236 along lines 238 while liquid crystal driver 240 receives signals from second table counter 158 along lines 242. These drivers 236 and 240 are the type CD4055, and their output serves to control the display functions on the liquid crystal corresponding to the counts registered by the first and second table counters 156 and 158. Both of the drivers are also timed by the clock circuit 224 by receiving signals along line 226.

As indicated, the first and second table limit sensors, the 50° sensor, the center sensor, the left and right side sensors, the bale loader down sensor and load rack down sensor all deliver signals to the network of gates as explained above. The first memory unit, ROM 194, is addressed by the encoder 192 and the second table counter 158, and the second memory unit, ROM 196 is addressed by the output of the first memory unit and the first table counter 156. The various latches 84, 86, 90, and 116 are fed by the gate network and the output from the second memory device. When the latches shift by the proper feed from the gate network and the second memory, the correct signals are delivered to the appropriate transistor drivers 130, 131, 132, 133, 134, 135, 136, 137, 138, and 139. These drivers are all type 75451 dual output drivers. In turn, the transistor drivers power the transistors 244, 245, 246, 247, 248, 249 250, 251 and 252 respectively.

Upon proper actuation of the appropriate latches, a correct logic level is delivered through transistor driver 131 to transistor 244 which in turn powers the appropriate solenoid valve along line 254 to raise the second table. Similarly upon command from the latch network, driver 132 powers transistor 245 to supply power to the appropriate solenoid valve along line 256 to lower the second table.

Similarly, drivers 133 and 134 turn on transistors 246 or 247 to drive the cross conveyor forward along line 257 or to reverse the cross conveyor by sending the power on line 258. Drivers 129 and 130 trigger either transistor 248 or 249 to send a signal along line 259 to the first table solenoid control valves to deliver bales on flat, or along line 260 to deliver the bales on edge.

Driver 137 triggers transistor 250 to deliver power along line 261 to enable the first table movement, and drivers 138 and 139 trigger transistors 251 or 252 to raise the tie tier spikes by line 262 or to lower the tie tier spikes by line 263.

The liquid crystal display 218 also functions to give an indication of whether the tie tier spikes are up or down. Further, the display gives an indication that either the first table, the second table, or the tie tier spikes are in a manual mode. This indication is provided by the appropriate indicia blinking on the display. Thus when the first table is in the manual mode, the indicia "first table auto" will flash on and off, whereas in the automatic mode, the indicia will constantly be on. The same is true for the indicia "2nd table auto" and "spikes down up". Gate 266 delivers a logic level along line 268, reversed by inverter 270 to device 274 which is a type CD4019 or equivalent. Additionally, the logic level out of inverter 270 is inverted by inverter 272 and is delivered to the device 274.

Gate 276 with line 278, and inverters 280 and 282, as well as gate 284 with line 286 and inverters 288 and 290 work in exactly the same manner as gate 266 and its associated inverters. Device 274 also receives a timing signal on line 291 from clock circuit 225. Thus when the manual mode is selected, a pulsing signal is delivered from device 274 through gates 292, 294 and 296 to flash on and off the associated displays indicating that the first table, second table, or tie tier spikes are in the manual mode. Gates 292, 294, and 296 are exclusive OR gates, as are gates 220, 221 22, and 223.

As indicated previously, a safety feature is built into the electronic package to prevent damage to the electronic components in the event of a short in one of the solenoid coils or power lines thereto. For this purpose, a 0.08Ω resistor is provided in each of output lines 254, 256, 257, 258, 259, 260, 261, 262, and 263, as indicated by 298. These output lines 254–263 are also connected in a closed loop through transistor blocks 300 and 302, 470Ω resistors 304 and 100 KΩ resistors 306. The transistors in blocks 300 and 302 all have common collectors connected to a latch in device 116 through lines 237. Thus, if the current in the output lines gets too high, for example in excess of 6 amps, as would be the case for a short, the associated transistors in blocks 300 and 302 will turn on and shift latch 116 and turn off the power output to all the lines 254–263. After a short has occurred, it is necessary to reset the latch in device 116, and this is accomplished by activating the "Preset Load" button 364 and switch 164.

In order to permit manual operation of the various functions of the bale wagon, a plurality of switches 310, 311 312, 313, 314, 315, and 316 are provided in the power output lines from transistors 244–252. When any of these switches is actuated, its related function is switched from the automatic mode. Thereafter, switches 317, 318, 319, 320, 321, and 323 may be actuated to operate the second table in either the up or down direction, to operate the first table for flat or edge delivery, or position the tie tier spikes up or down. When these switches are actuated in the manual mode, they are connected directly to 12 volt source by line 234.

Figure 3:
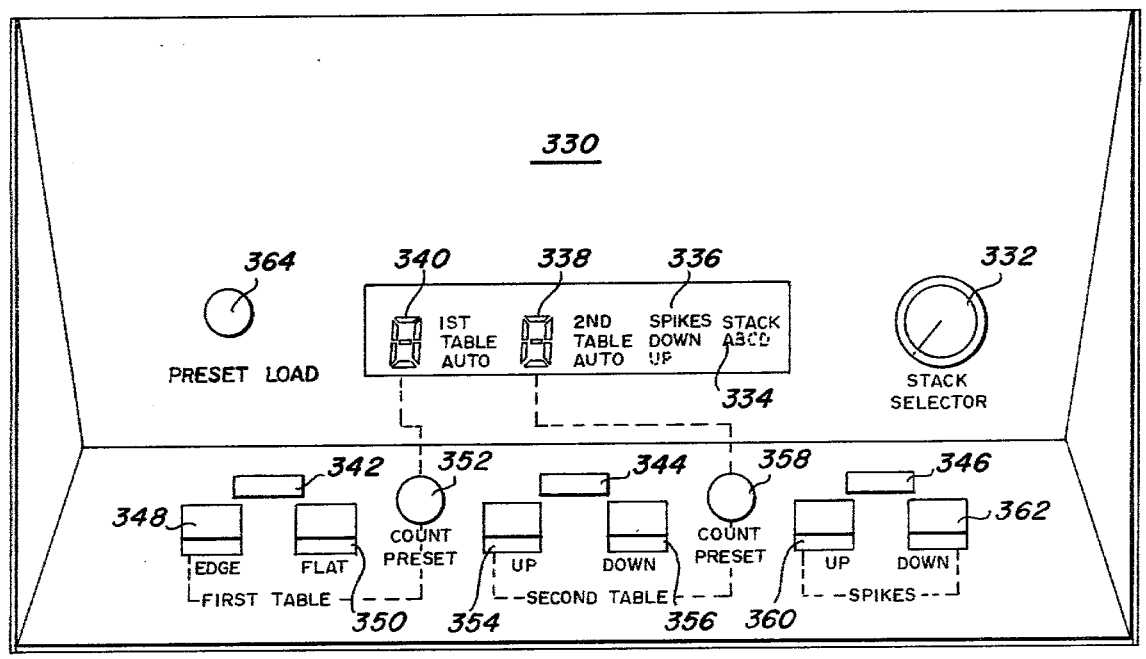
FIG. 3 is a plan view of the control panel used with the present invention.

With reference now to FIG. 3, the control-display panel for the control system is shown. The panel 330 includes a selector knob 332 which operates selector switch 184 for selecting the stack configuration. The configuration selected is then displayed on the liquid crystal display at 334. The word "stack" in the display 334 is constantly on by means of the signal received from gate 335 on line 337.

The display 336 gives an indication of whether the tie tier spikes are up or down, according to the signal received from gates 232 and 234.

Display 338 is used to indicate the number of cycles of the second table by displaying the output of the second table count 158. Similarly, display 340 indicated the number cycles of the first table as provided by the output of the first table counter 156.

Push button 342 controls switches 312 and 313 to switch from the automatic to the manual mode for the first table. Similarly, the push button 344 controls switches 310 and 311 to switch from the automatic to the manual mode for the second table control switches. Likewise, push button 346 controls switches 315 and 316 to switch from the automatic to the manual mode for the tie tier spike control.

In association with push button 342, when in the manual mode, push button 348 controls switch 320, while push button 350 controls switch 319 for edge or flat delivery of bales onto the second table. A push button 352 controls the switch 160 for setting display 340 as described supra.

Push button 354 is used to control switch 317, while push button 356 controls switch 318 for up or down control of the second table when in a manual mode. Push button 358 similarly controls preset switch 162 for setting the second table display 338.

Push buttons 360 and 362 are used to control switches 321 and 323 for manual positioning of the tie tier spikes.

The preset load button 364 is used to control switch 164 which is used to reset two latches in device 116 via line 170. One latch is set when either counter is advanced by the operator, while the other latch is set by either a short circuit or when power is initially applied to the circuit. Both of these operations are provided to prevent any circuit from operating by stray signals, when shorted, or inadvertently activated by the operator.

With respect to the ROM 196, Table 1 is the binary truth table for this device for a seven tier stack. As seen, the output of ROM 196 on bits $Y_0, Y_1 \ldots Y_7$ is a function of the address from the first table counter at columns 1, 2 and 4 and a function of the output from ROM 194 in columns 8, 16. The commands for the up and down spike control, center sensor enable function, edge enable function, second table up function, 50° enable function, and second table up enable function are given in the remainder of the columns. Table II is the same type truth table in written form.

TABLE I

| 16 8 | 4 | 2 | 1 | Spike U D $Y_0$ $Y_1$ | | C S En $Y_2$ | Edge En $Y_3$ | 2T Up $Y_4$ | 50° En $Y_5$ | 2TU En $Y_6$ | $Y_7$ |
|---|---|---|---|---|---|---|---|---|---|---|---|
| Tier 1 0 0 | 0 | 0 | 0 | 0 | 0 | 0 | 1 | 0 | 0 | 0 | |
| | 0 | 0 | 1 | 0 | 0 | 0 | 1 | 0 | 0 | 0 | |
| | 0 | 1 | 0 | 0 | 0 | 0 | 1 | 0 | 0 | 0 | |

TABLE I-continued

| 16 8 | 4 | 2 | 1 | Spike U D Y0 | Y1 | C S En Y2 | Edge En Y3 | 2T Up Y4 | 50° En Y5 | 2TU En Y6 | Y7 |
|---|---|---|---|---|---|---|---|---|---|---|---|
| | 0 | 1 | 1 | 0 0 | | 0 1 | | 0 0 | 0 | | |
| | 1 | 0 | 0 | 0 0 | | 0 1 | | 1 0 | 0 | | |
| Tier 2 | | | | | | | | | | | |
| 0 1 | 0 | 0 | 0 | 0 0 | | 0 0 | | 0 0 | 0 | | |
| | 0 | 0 | 1 | 0 0 | | 0 0 | | 0 0 | 0 | | |
| | 0 | 1 | 0 | 0 0 | | 0 0 | | 0 0 | 0 | | |
| | 0 | 1 | 1 | 0 0 | | 0 0 | | 0 0 | 0 | | |
| | 1 | 0 | 0 | 0 0 | | 0 0 | | 1 0 | 0 | | |
| Tier 3 | | | | | | | | | | | |
| 1 0 | 0 | 0 | 0 | 0 0 | | 0 0 | | 0 0 | 0 | | |
| | 0 | 0 | 1 | 1 0 | | 1 0 | | 0 0 | 0 | | |
| | 0 | 1 | 0 | 0 0 | | 1 0 | | 0 0 | 0 | | |
| | 0 | 1 | 1 | 0 1 | | 0 0 | | 1 1 | 0 | | |
| | 1 | 0 | 0 | 1 0 | | 1 0 | | 0 0 | 0 | | |
| | 1 | 0 | 1 | 0 0 | | 1 0 | | 0 0 | 0 | | |
| | 1 | 1 | 0 | 0 1 | | 1 0 | | 1 0 | 0 | | |
| Tier 4 | | | | | | | | | | | |
| 0 1 | 0 | 0 | 0 | 0 0 | | 0 0 | | 0 0 | 0 | | |
| | 0 | 0 | 1 | 0 0 | | 0 0 | | 0 0 | 0 | | |
| | 0 | 1 | 0 | 0 0 | | 0 0 | | 0 0 | 0 | | |
| | 0 | 1 | 1 | 0 0 | | 0 0 | | 0 0 | 0 | | |
| | 1 | 0 | 0 | 0 0 | | 0 0 | | 1 0 | 0 | | |
| Tier 5 | | | | | | | | | | | |
| 1 1 | 0 | 0 | 0 | 0 0 | | 0 0 | | 0 1 | 0 | | |
| | 0 | 0 | 1 | 0 0 | | 0 0 | | 1 1 | 0 | | |
| | 0 | 1 | 0 | 1 0 | | 1 0 | | 0 0 | 0 | | |
| | 0 | 1 | 1 | 0 0 | | 1 0 | | 0 0 | 0 | | |
| | 1 | 0 | 0 | 0 1 | | 0 0 | | 0 0 | 0 | | |
| | 1 | 0 | 1 | 0 0 | | 0 0 | | 1 0 | 0 | | |
| Tier 6 | | | | | | | | | | | |
| 1 1 | 0 | 0 | 0 | 0 0 | | 0 0 | | 0 1 | 0 | | |
| | 0 | 0 | 1 | 0 0 | | 0 0 | | 1 1 | 0 | | |
| | 0 | 1 | 0 | 1 0 | | 1 0 | | 0 0 | 0 | | |
| | 0 | 1 | 1 | 0 0 | | 1 0 | | 0 0 | 0 | | |
| | 1 | 0 | 0 | 0 1 | | 0 0 | | 0 0 | 0 | | |
| | 1 | 0 | 1 | 0 0 | | 0 0 | | 1 0 | 0 | | |
| Tier 7 | | | | | | | | | | | |
| 1 1 | 0 | 0 | 0 | 0 0 | | 0 0 | | 0 1 | 0 | | |
| | 0 | 0 | 1 | 0 0 | | 0 0 | | 1 1 | 0 | | |
| | 0 | 1 | 0 | 1 0 | | 1 0 | | 0 0 | 0 | | |
| | 0 | 1 | 1 | 0 0 | | 1 0 | | 0 0 | 0 | | |
| | 1 | 0 | 0 | 0 1 | | 0 0 | | 0 0 | 0 | | |
| | 1 | 0 | 1 | 0 0 | | 0 0 | | 1 0 | 0 | | |

TABLE II

| STEP # | DISPLAY COUNT | | | |
|---|---|---|---|---|
| 1 | 0 | 0 | | Right SSw |
| 2 | 0 | 1 | A₁ | Close Left SSw + Cycle 1st Table Edge |
| 3 | 0 | 1 | | Right SSw |
| 4 | 0 | 2 | A₂ | Close Left SSw + Cycle 1st Table Edge |
| 5 | 0 | 2 | | Right SSw |
| 6 | 0 | 3 | A₃ | Close Left SSw + Cycle 1st Table Edge |
| 7 | 0 | 3 | | Right SSw |
| 8 | 0 | 4 | A₄ | Close Left SSw + Cycle 1st Table Edge |
| 9 | 0 | 4 | | Right SSw |
| 10 | 0 | 5 | A₅ | Close Left SSw + Cycle 1st Table Edge + 1st Table Limit Sw Cycle 2nd Table |
| 11 | 1 | 0 | | Right SSw |
| 12 | 1 | 1 | B₁ | Close Left SSw + Cycle 1st Table Flat |
| 13 | 1 | 1 | | Right SSw |
| 14 | 1 | 2 | B₂ | Close Left SSw + Cycle 1st Table Flat |
| 15 | 1 | 2 | | Right SSw |
| 16 | 1 | 3 | B₃ | Close Left SSw + Cycle 1st Table Flat |
| 17 | 1 | 3 | | Right SSw |
| 18 | 1 | 4 | B₄ | Close Left SSw + Cycle 1st Table Flat + 1st Table Limit Sw Cycle 2nd Table |
| 19 | 2 | 0 | | Right SSw |
| 20 | 2 | 1 | C₁ | Close Left SSw + Cycle 1st Table Flat + 1st Table Limit Sw Set "Spikes Up" |
| 21 | 2 | 2 | C₂ | Close Center Sw + Cycle 1st Table Flat |
| 22 | 2 | 3 | C₃ | Close Center Sw + Cycle 1st Table Flat + 1st Table Limit Sw Set Spikes Down + Cycle 2nd Table 50° |
| 23 | 2 | 3 | | Right SSw |
| 24 | 2 | 4 | C₄ | Close Left SSw + Cycle 1st Table Flat + 1st Table Limit Sw Set "Spikes Up" |
| 25 | 2 | 5 | C₅ | Close Center Sw + Cycle 1st Table Flat |
| 26 | 2 | 6 | C₆ | Close Center Sw + Cycle 1st Table Flat + 1st Table Limit Sw Set Spikes Down + Cycle 2nd Table |
| 27 | 3 | 0 | | Right SSw |
| 28 | 3 | 1 | D₁ | Close Left SSw + Cycle 1st Table Flat |
| 29 | 3 | 1 | | Right SSw |
| 30 | 3 | 2 | D₂ | Close Left SSw + Cycle 1st Table Flat |
| 31 | 3 | 2 | | Right SSw |
| 32 | 3 | 3 | D₃ | Close Left SSw + Cycle 1st Table Flat |
| 33 | 3 | 3 | | Right SSw |
| 34 | 3 | 4 | D₄ | Close Left SSw + Cycle 1st Table Flat + 1st Table Limit Sw Cycle 2nd Table |
| 35 | 4 | 0 | | Right SSw |
| 36 | 4 | 1 | E₁ | Close Left SSw + Cycle 1st Table Flat + 1st Table Limit Sw Cycle 2nd Table 60° |
| 37 | 4 | 1 | | Right SSw |
| 38 | 4 | 2 | E₂ | Close Left SSw + Cycle 1st Table Flat + Set "Spikes Up" |
| 39 | 4 | 3 | E₃ | Close Center Sw + Cycle 1st Table Flat |
| 40 | 4 | 4 | E₄ | Close Center Sw + Cycle 1st Table Flat + 1st Table Limit Sw Set Spikes Down |
| 41 | 4 | 4 | | Right SSw |
| 42 | 4 | 5 | E₅ | Close Left SSw + Cycle 1st Table Flat + 1st Table Limit Sw Cycle 2nd Table |
| 43 | 5 | 0 | | Right SSw |
| 44 | 5 | 1 | F₁ | Close Left SSw + Cycle 1st Table Flat + 1st Table Limit Sw Set "Spikes Up" |
| 45 | 5 | 2 | F₂ | Close Center SSw + Cycle 1st Table Flat |
| 46 | 5 | 3 | F₃ | Close Center Sw + Cycle 1st Table Flat + 1st Table Limit Sw Set Spikes Down + Cycle 2nd Table 60° |
| 47 | 5 | 3 | | Right SSw |
| 48 | 5 | 4 | F₄ | Close Left SSw + Cycle 1st Table Flat + 1st Table Limit Sw Set "Spikes Up" |
| 49 | 5 | 5 | F₅ | Close Center SW + Cycle 1st Table Flat |
| 50 | 5 | 6 | F₆ | Close Center Sw + Cycle 1st Table Flat + 1st Table Limit Sw Set Spikes Down + Cycle 2nd Table |

TABLE II-continued

| STEP # | DISPLAY COUNT | | | |
|---|---|---|---|---|
| 51 | 6 | 0 | | Right SSw |
| 52 | 6 | 1 | G₁ | Close Left SSw + Cycle 1st Table Flat |
| 53 | 6 | 1 | | Right SSw |
| 54 | 6 | 2 | G₂ | Close Left SSw + Cycle 1st Table Flat |
| 55 | 6 | 2 | | Right SSw |
| 56 | 6 | 3 | G₃ | Close Left SSw + Cycle 1st Table Flat |
| 57 | 6 | 3 | | Right SSw |
| 58 | 6 | 4 | G₄ | Close Left SSw + Cycle 1st Table Flat + 1st Table Limit Sw Cycles 2nd Table |

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. In a bale wagon including first and second bale accumulating means and including bale handling means for sequentially picking up bales of crop material and arranging said bales into tiers and stacks, and further including means, feeding hydraulic fluid under pressure to said bale handling means, a sequential control system for said feeding means and said bale handling means comprising:

a plurality of solenoid valves for controlling flow of said hydraulic fluid, an electronic gate network, a plurality of sensors for feeding data to said gate network representative of the operation state of said bale handling means, first counter means providing output data representative of the number of completed cycles of said first accumulating means has during a loading sequence, second counter means providing output data representative of the number of completed cycles of said second accumulating means has during a loading sequence, first memory means having stored therein data representative of a plurality of individually selectable stack configurations, means for addressing said first memory means with a signal representative of a selected one of said stack configurations and said output data from said second counter means and providing an output from said first memory means, second memory means addressable by said output from said first memory and said output from said first counter means for providing control signals, and latch means operated by said control signals and output signals from said gate network for providing command signals to said solenoid valves for operating selected ones of said solenoid valves and thereby said bale handling means sequentially for forming said selected one of said stack configurations.

2. A control system as in claim 1 and including:
    transistor means having outputs for powering each of said solenoid valves when turned on,
    electronic driver means for triggering said transistor means,
    said latch means providing said command signals to said driver means for selectively enabling said driver means.

3. A control system as in claim 2 and including:
    means for limiting the current of said transistor outputs to a predetermined value.
    means shutting down said transistor outputs when said transistor outputs exceed said predetermined value.

4. A control system as in claim 1 and including:
    means for displaying the number of times said first and second accumulating means have cycled.

5. A control system as in claim 4 and wherein:
    said displaying means comprises a liquid crystal display,
    liquid crystal driver means receiving output signals from said first and second counter means,
    timing means for providing a synchronizing signal to said liquid crystal drive means.

6. A control system as in claim 4 and wherein:
    said displaying means includes means providing a display indicative of said selected one of said stack configurations.

7. A control system as in claim 1 and wherein:
    said first and second memory means comprise read only memory devices.

8. A control system as in claim 1 and including:
    means for automatically resetting said first counter means to zero after each completed cycle of said second bale accumulating means.

9. A control system as in claim 1 and including:
    means for automatically resetting said first and second counter means to zero after a stack of bales has been delivered from said bale wagon.

10. A control system as in claim 9 and wherein:
    said bale wagon includes a stack accumulating table tiltable for delivering a stack formed thereon,
    said automatic resetting means comprising sensor means responsive to return of said stack accumulating table to a tier receiving position for providing a reset signal to said first and second counter means.

11. A control system as in claim 8 and wherein:
    said automatic resetting means comprises a sensor responsive to return of said second table from a tier delivering position to a bale receiving position.

12. A control system as in claim 1 and wherein:
    said first accumulating means includes reversible conveyor means for positioning bales thereon,
    a first sensor member responsive to positioning of a first bale at one end of said first accumulating means and providing a signal for reversing said conveyor and moving a second bale to the other end of said first accumulating means and activating a second sensor when said second bale reaches said other end of said first accumulating means for stopping said conveyor.

* * * * *